(12) United States Patent
Pan et al.

(10) Patent No.: US 12,187,948 B2
(45) Date of Patent: Jan. 7, 2025

(54) INTELLIGENT ANTI-ICING MATERIAL AND PREPARATION METHOD AND USE THEREOF

(71) Applicant: NANJING UNIVERSITY OF AERONAUTICS AND ASTRONAUTICS, Jiangsu (CN)

(72) Inventors: Lei Pan, Jiangsu (CN); Huaxin Guo, Jiangsu (CN); Fei Wang, Jiangsu (CN); Xiaofei Pang, Jiangsu (CN); Lang Zhong, Jiangsu (CN); Xiaosa Yuan, Jiangsu (CN); Jingling Hu, Jiangsu (CN)

(73) Assignee: Lei Pan (CN)

( * ) Notice: Subject to any disclaimer, the term of this patent is extended or adjusted under 35 U.S.C. 154(b) by 395 days.

(21) Appl. No.: 17/299,064

(22) PCT Filed: Sep. 23, 2020

(86) PCT No.: PCT/CN2020/117095
§ 371 (c)(1),
(2) Date: Jun. 2, 2021

(87) PCT Pub. No.: WO2021/057786
PCT Pub. Date: Apr. 1, 2021

(65) Prior Publication Data
US 2022/0213367 A1      Jul. 7, 2022

(30) Foreign Application Priority Data
Sep. 23, 2019 (CN) .......................... 201910898261.2

(51) Int. Cl.
*C09K 3/18* (2006.01)
*C08K 3/08* (2006.01)
*C08K 9/04* (2006.01)

(52) U.S. Cl.
CPC .................. *C09K 3/18* (2013.01); *C08K 3/08* (2013.01); *C08K 9/04* (2013.01)

(58) Field of Classification Search
CPC ... C09K 3/18; C09K 5/00; C09K 5/08; C08K 3/08; C08K 9/04
See application file for complete search history.

(56) References Cited

U.S. PATENT DOCUMENTS

| 7,780,646 B2 * | 8/2010 | Farnholtz | .......... A61M 25/0053 604/525 |
| 7,993,537 B2 * | 8/2011 | Hector, Jr. | ............. C09K 13/04 216/34 |

FOREIGN PATENT DOCUMENTS

| CN | 106347269 A | 1/2017 |
| CN | 106496956 A | 3/2017 |

(Continued)

OTHER PUBLICATIONS

Smith et al. Composites Part A, 35, 2004, 1307-1312. Published Mar. 2004 (Year: 2004).*

(Continued)

*Primary Examiner* — Jane L Stanley
(74) *Attorney, Agent, or Firm* — Kunzler Bean & Adamson

(57) ABSTRACT

An intelligent anti-icing material and a preparation method and use thereof are disclosed. The intelligent anti-icing material includes a hydrophobic resin and a nickel-titanium alloy wire embedded in the hydrophobic resin. When the surrounding temperature decreases, the hydrophobic resin in the intelligent anti-icing material shrinks, and the nickel-titanium alloy wire featured by thermoelastic martensitic transformation undergoes phase transformation and expands, which changes the direction of the expansion force inside the ice layer, and thus tiny cracks occur at the interface between the ice layer and the surface of the (Continued)

material, thereby reducing the adhesion of the ice layer to the surface of the material, accelerating the spontaneous shedding of the ice layer, without heating, and achieving an excellent anti-icing effect.

15 Claims, 1 Drawing Sheet

(56) References Cited

FOREIGN PATENT DOCUMENTS

| CN | 109423197 A | | 3/2019 | |
|---|---|---|---|---|
| CN | 109513590 A | * | 3/2019 | ............... B05D 5/00 |
| CN | 110591227 A | | 12/2019 | |
| EP | 0399092 A2 | | 11/1990 | |

OTHER PUBLICATIONS

Antico et al. Smart Materials and Structure, 21, 2012, 035022. Published Feb. 17, 2012. (Year: 2012).*
Clarivate Analytics machine translation of CN 106496956 A to Wang et al. Published Mar. 15, 2017 (Year: 2017).*
Clarivate Analytics machine translation of CN 109513590 A to Zhang et al. Published Mar. 26, 2019 (Year: 2019).*

* cited by examiner

INTELLIGENT ANTI-ICING MATERIAL AND PREPARATION METHOD AND USE THEREOF

CROSS REFERENCE TO RELATED APPLICATION

This patent application claims the benefit and priority of Chinese Patent Application No. 201910898261.2 filed on Sep. 23, 2019 with Chinese National Intellectual Property Administration, entitled by "Intelligent anti-icing material and preparation method and use thereof", which is incorporated by reference herein in its entirety.

TECHNICAL FIELD

The present disclosure belongs to the technical field of composite materials, and more particularly relates to an intelligent anti-icing material and a preparation method and use thereof.

BACKGROUND ART

Ice-coating phenomena such as precipitation icing and sublimation icing are very common in nature. In most cases, icing will bring great inconvenience to people's production and life, especially in terms of transportation and external equipment. The continuous attachment and accumulation of ice causes traffic obstruction and damage to equipment. Existing methods for eliminating icing include mechanical deicing and thermal deicing; however, for mechanical deicing, means such as beating is generally used, which is likely to cause damages to the equipment and the surface thereof, and both mechanical and thermal deicing consume large amounts of energy. If the surface of the equipment or material exhibits anti-icing properties, which to a certain extent reduces the deicing work. For this purpose, carrying out research on anti-icing materials can fundamentally prevent the occurrence of icing, which has important safety significance and economic value.

At present, the anti-icing method essentially comprises using the surface structure of the equipment or material itself as a heat source to form an anti-icing system, so as to avoid surface icing and attachment. However, for this method, it is required that the heating power is enough high to ensure that the surface temperature remains above the freezing point, which consumes large amounts of energy. Alternatively, heating can be combined with coating with hydrophobic materials (for example, Chinese patent application No. 201710508043.4 disclosed an anti-icing film and a preparation method thereof), but in this method, a heat source is still needed, consuming energy, and this method involves epoxy resin and rubber as the matrix resin of the coating materials, wherein the resin must be molded at one time, being inconvenient for application, and the rubber is easy to age during low-temperature service, having a short service life.

Therefore, it is of great significance to national safety and economic development to provide an anti-icing material with lower or even no energy consumption, convenient for use and good anti-icing effect.

SUMMARY

In view of this, an objective of the present disclosure is to provide an intelligent anti-icing material, without heating, featured by convenient for use and good anti-icing effects; a further objective of the present disclosure is to provide a preparation method and use of the intelligent anti-icing material.

In order to achieve the above objectives, the present disclosure provides the following technical solutions:

The present disclosure provides an intelligent anti-icing material, comprising a hydrophobic resin and a nickel-titanium alloy wire embedded in the hydrophobic resin.

In some embodiments, the hydrophobic resin is polypropylene resin or polyether ether ketone resin.

In some embodiments, the nickel-titanium alloy wire has a martensite transformation point temperature of −30 to −10° C.

In some embodiments, the nickel-titanium alloy wire comprises not less than 50.5% by weight of nickel.

In some embodiments, the nickel-titanium alloy wire has a length of 0.3 to 1.5 cm, and a diameter of 70 to 160 μm.

In some embodiments, the nickel-titanium alloy wire accounts for 10 to 30% of the total volume of the hydrophobic resin and the nickel-titanium alloy wire.

The present disclosure also provides a method for preparing the intelligent anti-icing material as described in the above technical solution, comprising steps of (1) hydroxylating the nickel-titanium alloy wire, to obtain a hydroxylated nickel-titanium alloy wire;

(2) coating the hydroxylated nickel-titanium alloy wire obtained in step (1) with a binder, to obtain a nickel-titanium alloy wire to be bonded; and (3) subjecting the nickel-titanium alloy wire to be bonded obtained in step (2) and the hydrophobic resin to a mixing and granulating, and an injection molding in sequence, to obtain the intelligent anti-icing material.

In some embodiments, hydroxylating the nickel-titanium alloy wire in step (1) is preformed by using a reagent, i.e. Piranha solution; in some embodiments, hydroxylating the nickel-titanium alloy wire in step (1) is preformed at a temperature of 70 to 90° C. for 3 to 5 minutes.

In some embodiments, the binder used in step (2) is a Schiff alkali metal complex.

The present disclosure also provides use of the intelligent anti-icing material as described in the above technical solution or the intelligent anti-icing material prepared by the method as described in the above technical solution in the field of anti-icing.

The present disclosure provides an intelligent anti-icing material, comprising a hydrophobic resin and a nickel-titanium alloy wire embedded in the hydrophobic resin. The hydrophobic resin comprised in the intelligent anti-icing material according to the present disclosure exhibits certain hydrophobic properties, which reduces the possibility of moisture staying on the surface of the material; when the surrounding temperature decreases, the hydrophobic resin comprised in the intelligent anti-icing material according to the present disclosure shrinks, and meanwhile, the nickel-titanium alloy wire featured by thermoelastic martensitic transformation undergoes phase transformation and expands, which changes the direction of the expansion force inside the ice layer, and thus tiny cracks occur at the interface between the ice layer and the surface of the material, thereby reducing the adhesion of the ice layer to the surface of the material, accelerating the autonomous shedding of the ice layer, and achieving an excellent anti-icing effect; moreover, during the entire anti-icing use process, no additional heat source is required, achieving lower energy consumption or even no energy consumption; when the surrounding temperature rises, the hydrophobic resin and the nickel-titanium alloy wire recover their morphology and thus the material exhibits repeated anti-icing performance.

Experimental results show that the intelligent anti-icing material according to the present disclosure has a good anti-icing effect; the intelligent anti-icing material according to the present disclosure exhibits that at −20° C., the adhesion of the ice layer to its surface is reduced by 18.2-24.2%, compared with that of self-reinforced PP materials.

BRIEF DESCRIPTION OF THE DRAWINGS

In FIGS. 1 and 2, 1 represents an ice layer, 2 represents a hydrophobic resin, 3 represents a nickel-titanium alloy wire, and 4 represents a matrix resin plate.

DETAILED DESCRIPTION OF THE EMBODIMENTS

The present disclosure provides an intelligent anti-icing material, comprising a hydrophobic resin and a nickel-titanium alloy wire embedded in the hydrophobic resin.

In the present disclosure, unless otherwise specified, the components are all commercially available products well known to those skilled in the art.

In some embodiments of the present disclosure, the hydrophobic resin has a thermal expansion coefficient of not less than $90.5 \times 10^{-6}$ $K^{-1}$. In some embodiments of the present disclosure, the hydrophobic resin is polypropylene (PP) resin or polyether ether ketone (PEEK) resin.

In some embodiments of the present disclosure, the nickel-titanium alloy wire has a martensite transformation point temperature of −30 to −10° C., preferably −25 to −15° C. In some embodiments of the present disclosure, the nickel-titanium alloy wire comprises not less than 50.5% by weight of nickel, specifically such as 58.6% by weight of nickel (Ti-58.6Ni) or 50.8% by weight of nickel (i.e. Ti-50.8Ni). In some embodiments of the present disclosure, the nickel-titanium alloy wire has a length of 0.3 to 1.5 cm, preferably 0.4 to 1.2 cm, and has a diameter of 70 to 160 μm, preferably 80 to 150 μm. In some embodiments of the present disclosure, the nickel-titanium alloy wire is a hydroxylated nickel-titanium alloy wire.

In some embodiments of the present disclosure, the nickel-titanium alloy wire accounts for 10% to 30% of the total volume of the hydrophobic resin and the nickel-titanium alloy wire, and preferably 15% to 25%.

Figure 1:
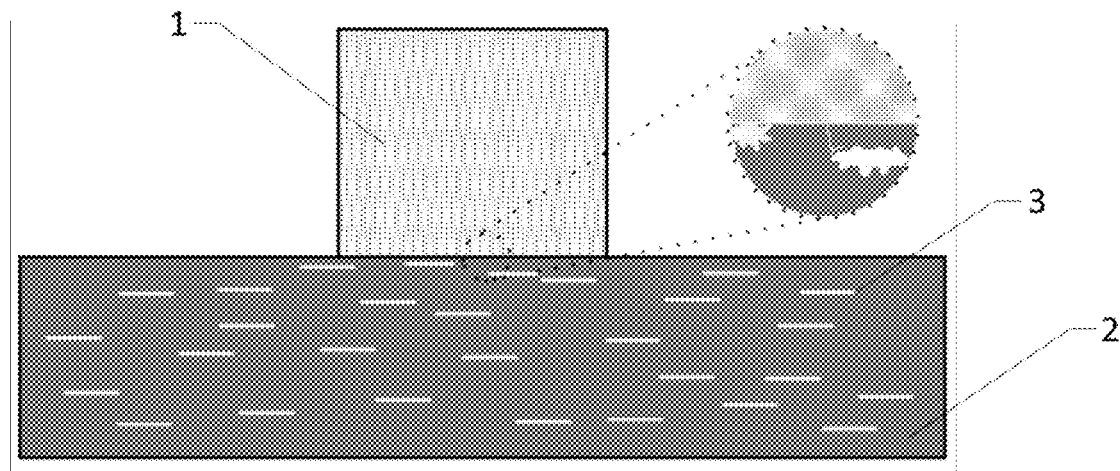
FIG. 1 shows a schematic diagram illustrating the principle of low-temperature anti-icing of the intelligent anti-icing material according to the present disclosure.

As shown in FIG. 1, the present disclosure provides an intelligent anti-icing material, comprising a hydrophobic resin and a nickel-titanium alloy wire embedded in the hydrophobic resin. In FIG. 1, 1 represents an ice layer, 2 represents a hydrophobic resin, and 3 represents a nickel-titanium alloy wire. The hydrophobic resin comprised in the intelligent anti-icing material according to the present disclosure has certain hydrophobic properties, which reduces the possibility of moisture staying on the surface of the material. As shown in the partially-enlarged view in FIG. 1, when the surrounding temperature decreases, the hydrophobic resin comprised in the intelligent anti-icing material according to the present disclosure shrinks, and meanwhile, the nickel-titanium alloy wire featured by thermoelastic martensitic transformation undergoes phase transformation and expands, which changes the direction of the expansion force inside the ice layer, and thus tiny cracks occur at the interface between the ice layer and the surface of the material, thereby reducing the adhesion of the ice layer to the surface of the material, accelerating the autonomous shedding of the ice layer, and achieving an excellent anti-icing effect; moreover, during the entire anti-icing use process, no additional heat source is required, achieving lower or even no energy consumption; when the surrounding temperature rises, the hydrophobic resin and the nickel-titanium alloy wire recover their morphology, and thus the material exhibits repeated anti-icing performance.

The present disclosure also provides a method for preparing the intelligent anti-icing material as described in the above technical solution, comprising steps of (1) hydroxylating the nickel-titanium alloy wire, to obtain a hydroxylated nickel-titanium alloy wire;

(2) coating the hydroxylated nickel-titanium alloy wire obtained in step (1) with a binder, to obtain a nickel-titanium alloy wire to be bonded; and (3) subjecting the nickel-titanium alloy wire to be bonded obtained in step (2) and the hydrophobic resin to a mixing and granulating, and an injection molding in sequence, to obtain the intelligent anti-icing material.

In the present disclosure, the amount of each component used in the method is the same as the amount of the component comprised in the intelligent anti-icing material in the aforementioned technical solution, which will not be repeated here.

In the present disclosure, the nickel-titanium alloy wire is hydroxylated, to obtain a hydroxylated nickel-titanium alloy wire. In some embodiments of the present disclosure, hydroxylating the nickel-titanium alloy wire is preformed by using a reagent, i.e. Piranha solution; in some embodiments, hydroxylating the nickel-titanium alloy wire is preformed at a temperature of 70 to 90° C., and preferably 75 to 85° C.; in some embodiments, hydroxylating the nickel-titanium alloy wire is preformed for 3 to 5 minutes, and preferably 3.5 to 4.5 minutes.

In some embodiments of the present disclosure, after the hydroxylating, the hydroxylated nickel-titanium alloy wire is taken out of Piranha solution by a filtration, preferably a suction filtration; there is no particular limitation to the filtration conditions, and any filtration conditions well known to those skilled in the art could be used. In the present disclosure, the hydroxylating enables the generation of hydroxyl groups on the surface of the nickel-titanium alloy wire, which is beneficial to the bonding between the binder and the surface of the nickel-titanium alloy wire; meanwhile, the hydroxyl groups interact with the hydrogen bond and other groups in the hydrophobic resin to entangle the nickel titanium alloy wire with the hydrophobic resin, so that the interface bonding performance between the nickel-titanium alloy wire and the hydrophobic resin is better.

In some embodiments of the present disclosure, the method further comprises before hydroxylating the nickel-titanium alloy wire, subjecting the nickel-titanium alloy wire to a heat treatment and a pretreatment in sequence. In some embodiments of the present disclosure, subjecting the nickel-titanium alloy wire to a heat treatment comprises subjecting the nickel-titanium alloy wire to an annealing and a high-temperature maintaining in sequence. In some embodiments of the present disclosure, the annealing is performed at a temperature of 400 to 700° C., and preferably 450 to 650° C.; in some embodiments, the annealing is performed for 20 to 130 minutes, and preferably 25 to 130 minutes; in some embodiments, the annealing comprises a cooling, and the cooling is performed by a water quenching or a air cooling. In some embodiments of the present disclosure, the high-temperature maintaining is performed at a temperature of 300 to 450° C., and preferably 350 to 400° C.; in some embodiments of the present disclosure, the high-temperature maintaining is performed for 12 to 24 hours, and preferably 15 to 21 hours. In the present disclosure, the heat treatment makes it possible to reduce the martensite transformation temperature of the nickel-titanium alloy wire to below zero.

In some embodiments of the present disclosure, the pretreatment comprises an acetone washing, an acid washing/alkali washing, a water washing and a drying performed in sequence. In some embodiments of the present disclosure, the acetone washing is performed for 30 to 60 minutes, preferably 35 to 55 minutes, and more preferably 40 to 50 minutes. In some embodiments of the present disclosure, the acetone washing is performed under an ultrasonic; in some embodiments, the ultrasonic has a frequency of 50 to 100 Hz, preferably 60 to 90 Hz, and more preferably 70 to 80 Hz. In the present disclosure, the acetone washing is to remove impurities on the surface of the nickel-titanium alloy wire. In some embodiments of the present disclosure, the acid washing/alkali washing means that the acid washing and alkali washing are performed in the alternative. In some embodiments of the present disclosure, the washing solution for the acid washing is a mixed solution of hydrofluoric acid and nitric acid, and the washing solution for the alkali washing is a sodium hydroxide solution. In some embodiments, the sodium hydroxide solution has a mass concentration of 30 to 40%, more preferably 33 to 37%; in some embodiments, the mixed solution of hydrofluoric acid and nitric acid comprises 48 to 60 g/L hydrofluoric acid and 280 to 350 g/L nitric acid. In the present disclosure, the oxides layer on the surface of the nickel-titanium alloy wire is removed by the acid washing or alkali washing. In the present disclosure, there is no particular limitation to the water used for the water washing, and any water could be used as long as the washing solution used in the acid washing/alkali washing could be removed, for example distilled water. There is no particular limitation to the temperature and time for the drying, as long as the moisture remaining on the surface of the nickel-titanium alloy wire after the water washing could be removed. In the present disclosure, through the pretreatment, impurities and the oxides layer on the surface of the nickel-titanium alloy wire could be removed, to obtain a dry surface, and to provide a dry and clean surface for the hydroxylating, which is beneficial to hydroxylate the nickel-titanium alloy wire well.

In the present disclosure, after obtaining the hydroxylated nickel-titanium alloy wire, the hydroxylated nickel-titanium alloy wire is coated with a binder, to obtain a nickel-titanium alloy wire to be bonded. In some embodiments of the present disclosure, the binder is a Schiff alkali metal complex. In some embodiments of the present disclosure, the Schiff alkali metal complex is di-tert-butyl salicylaldehyde-ethylenediamine-titanium complex. In some embodiments of the present disclosure, the coating is performed as follows: immersing the hydroxylated nickel-titanium alloy wire in a binder solution, then taking it out, subjecting it to a filtration, a washing and a drying in sequence, to obtain the nickel-titanium alloy wire to be bonded. In some embodiments of the present disclosure, the solvent of the binder solution is N,N-dimethylformamide (DMF) or N-methylpyrrolidone (NMP); in some embodiments, the binder solution has a concentration of 15 to 20 g/L, more preferably 16 to 19 g/L.

In some embodiments of the present disclosure, immersing the hydroxylated nickel-titanium alloy wire in a binder solution is performed for 3 to 5 hours, more preferably 3.5 to 4.5 hours. In some embodiments of the present disclosure, immersing the hydroxylated nickel-titanium alloy wire in a binder solution is performed under an ultrasonic; in some embodiments, the ultrasonic has a frequency of 100 Hz. In some embodiments of the present disclosure, the filtration is a suction filtration. In the present disclosure, there is no particular limitation to the conditions of the suction filtration, and the suction filtration conditions well known to those skilled in the art could be used. In the present disclosure, there is no particular limitation to the means for the washing and drying, and any means for the washing and drying well known to those skilled in the art could be used.

In some embodiments of the present disclosure, the method further comprises before coating with a binder, cleaning and drying the hydroxylated nickel-titanium alloy wire. There is no particular limitation to the means for the cleaning and drying, and any means for the cleaning and drying well known to those skilled in the art could be used.

After obtaining the nickel-titanium alloy wire to be bonded, the nickel-titanium alloy wire to be bonded and the hydrophobic resin are subjected to a mixing and granulating, and an injection molding in sequence, to obtain the intelligent anti-icing material.

In some embodiments of the present disclosure, a volume ratio of the nickel-titanium alloy wire to be bonded to the hydrophobic resin is in a range of 1:9 to 3:7, more preferably 3:17 to 1:3, for example 1:5 or 1:3.

In the present disclosure, the nickel-titanium alloy wire to be bonded and the hydrophobic resin are subjected to a mixing and granulating, to obtain a granular material. In some embodiments of the present disclosure, the mixing and granulating is performed by an extrusion granulation, preferably a twin-screw extrusion granulation. In some embodiments, subjecting the nickel-titanium alloy wire to be bonded and the hydrophobic resin to a mixing and granulating is specifically performed as follows: feeding the nickel-titanium alloy wire to be bonded and the hydrophobic resin into a granulation device, extruding to form a stretched strip, and cooling the stretched strip, and shredding the cooled stretched strip, to obtain a granular material. In some embodiments of the present disclosure, the granulation device is a twin-screw extrusion granulator; in some embodiments, the main machine of the granulation device is run at a rotation speed of 260 rpm. In some embodiments of the present disclosure, under the condition that the hydrophobic resin is polypropylene resin, the mixing and granulating is performed with a extrusion temperature of 200 to 240° C.; under the condition that the hydrophobic resin is polyetheretherketone resin, the mixing and granulating is performed with a extrusion temperature of 340 to 390° C.

In the present disclosure, after the granular material is obtained, the obtained granular material is subjecting to an injection molding, to obtain the intelligent anti-icing material. In some embodiments of the present disclosure, the device for the injection molding is an injection molding machine. In the present disclosure, there is no particular limitation to the process of the injection molding, and any process for the injection molding well known to those skilled in the art could be used. In the present disclosure, the injection molding enables the obtained intelligent anti-icing material to be made into a sheet.

The present disclosure also provides use of the intelligent anti-icing material as described in the above technical solution or the anti-icing material prepared by the method as described in the above technical solution in the field of anti-icing.

In some embodiments of the present disclosure, the use comprises covering the surface of a device or a material to be designed anti-icing with the intelligent anti-icing material, and hot pressing, to obtain an anti-icing composite material. In the present disclosure, there is no particular limitation to the process of hot pressing, according to the performance requirements of the device or materials to be designed anti-icing, any process of hot pressing well known to those skilled in the art could be used. When the surrounding temperature decreases below the freezing point, the intelligent anti-icing material covering the surface of the composite material undergoes a morphological change, during which the hydrophobic resin therein shrinks, and the nickel-titanium alloy wire embedded in the hydrophobic resin undergoes phase change and expands, which cause that tiny cracks occur at the interface between the generated ice layer (resulting from the decreased surrounding temperature) and the surface of the intelligent anti-icing material, thereby reducing the adhesion of the ice layer to the surface of the intelligent anti-icing material, accelerating the shedding of the ice layer, and achieving an excellent anti-icing effect without energy consumption, for example from an additional heat source.

In order to further illustrate the present disclosure, the intelligent anti-icing material according to the present disclosure and a preparation method and use thereof will be described in detail below in conjunction with examples, but these examples should not be understood as limiting the protection scope of the present disclosure. Obviously, the described examples are only a part of the embodiments of the present disclosure, rather than all the embodiments. Based on the examples of the present disclosure, all other embodiments obtained by those of ordinary skill in the art without creative labor shall fall within the protection scope of the present disclosure.

EXAMPLE 1

The heat treatment was performed as follows: a nickel-titanium alloy wire with a diameter of 150 μm and a length of 0.3 cm (with a composition of Ti-50.8Ni) was annealed at 650° C. for 25 minutes, water quenched, and then kept at 300° C. for 24 hours, obtaining a nickel-titanium alloy wire with a martensite transformation point temperature of −30 to −10° C.

The pretreatment was performed as follows: the heat-treated nickel-titanium alloy wire was washed and sonicated in acetone at 100 Hz for 30 minutes, washed with distilled water, and washed in a mixed solution of hydrofluoric acid, nitric acid and water with a volume ratio of 1:5:2 for 30 seconds, and blown to dry with $N_2$.

The intelligent anti-icing material was prepared as follows: the pretreated nickel-titanium alloy wire was immersed in Piranha solution, at 90° C. for 3 minutes; the resulting mixture was subjected to a suction filtration, washed with distilled water and dried, obtaining a hydroxylated nickel-titanium alloy wire; the hydroxylated nickel-titanium alloy wire was immersed in a Schiff alkali metal complex/DMF solution, ultrasonically dispersed at a frequency of 100 Hz for 5 hours; the resulting mixture was subjected to a suction filtration, washed with water and dried, obtaining a nickel-titanium alloy wire to be bonded; the obtained nickel-titanium alloy wire to be bonded and polypropylene resin were added to a high-speed mixer with a volume ratio of 1:5, mixed to be uniform, and then extruded and granulated by a twin-screw extrusion granulator, with a extrusion temperature of 200 to 240° C., and a rotation speed of the main machine of the twin-screw extrusion granulator of 260 rpm, obtaining a granular material; the granular material are injected into a sheet form by an injection molding machine, obtaining the intelligent anti-icing material.

EXAMPLE 2

The heat treatment was performed as follows: a nickel-titanium alloy wire with a diameter of 80 μm and a length of 0.3 cm (with a composition of Ti-58.6Ni) was annealed at 450° C. for 120 minutes, air-cooled, and then kept at 400° C. for 24 hours, obtaining a nickel-titanium alloy wire with a martensite transformation point temperature of −30 to −10° C.

The pretreatment was performed as follows: the heat-treated nickel-titanium alloy wire was washed and sonicated in acetone at 100 Hz for 30 minutes, washed with distilled water, and washed with a mixed solution of hydrofluoric acid, nitric acid and water with a volume ratio of 1:5:2 for 15 seconds, and blown to dry with $N_2$.

The intelligent anti-icing material was prepared as follows: the pretreated nickel-titanium alloy wire was immersed in Piranha solution, at 90° C. for 1.5 minutes; the resulting mixture was subjected to a suction filtration, washed with distilled water and dried, obtaining a hydroxylated nickel-titanium alloy wire; the hydroxylated nickel-titanium alloy wire was immersed in a Schiff alkali metal complex/DMF solution, ultrasonically dispersed at a frequency of 100 Hz for 5 hours; the resulting mixture was subjected to a suction filtration, washed with water and dried, obtaining a nickel-titanium alloy wire to be bonded; the nickel-titanium alloy wire to be bonded and polyether ether ketone resin were added to a high-speed mixer at a volume ratio of 1:3 and mixed to be uniform, and then extruded and granulated by a twin-screw extrusion granulator, with a extrusion temperature of 340 to 390° C., and a rotation speed of the main machine of the twin-screw extrusion granulator of 260 rpm, obtaining a granular material; the granular material was injected into a sheet form by an injection molding machine, obtaining an intelligent anti-icing material.

Use Example 1

Figure 2:
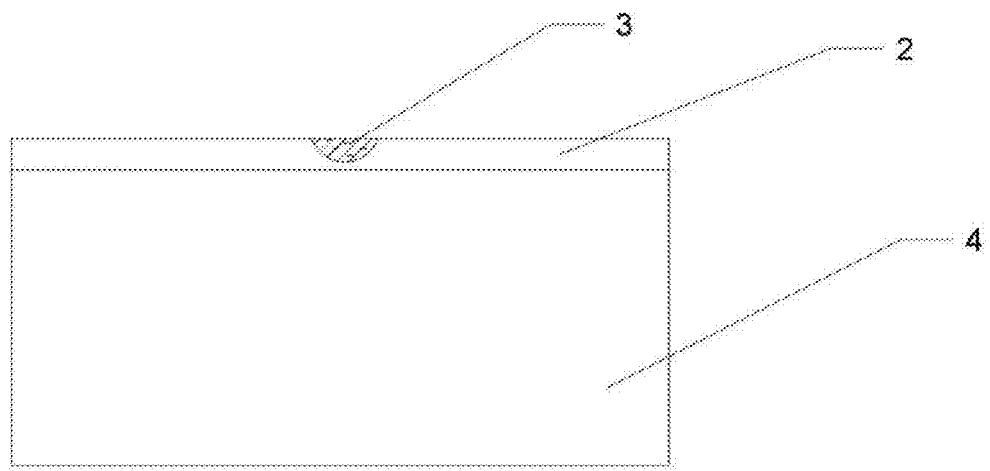
FIG. 2 shows a structural diagram illustrating use of the intelligent anti-icing material as prepared in Example 1 in Use example 1.

The intelligent anti-icing material obtained in Example 1 was laid on the surface of polypropylene resin (matrix resin plate), and hot pressed at 1 MPa and 180° C. for 40 minutes, obtaining an anti-icing composite material. FIG. 2 shows a schematic diagram of Use Example 1 of the present disclosure. In FIG. 2, 2 represents a resin, 3 represents a nickel-titanium alloy wire, and 4 represents a matrix resin plate.

The obtained anti-icing composite material was tested as follows: a tester for the adhesion of the ice layer was set up, and the stage was cooled and maintained at −20° C. (freezing temperature) with a constant temperature circulating cooling box, with an ice-pushing rate of 1 mm/s; the adhesion of the ice layer was characterized by the shear strength required to push down the icicle.

The test result shows that the adhesion of the ice layer was 54 kPa.

Use Example 2

The intelligent anti-icing material obtained in Example 2 was laid on the surface of polyetheretherketone resin, and hot pressed at 0.6 MPa and 390° C. for 30 minutes, obtaining an anti-icing composite material.

The obtained anti-icing composite material was tested as follows: a tester for the adhesion of the ice layer was set up, and the stage was cooled and maintained at −20° C. (freezing temperature) with a constant temperature circulating cooling box, with an ice-pushing rate of 1 mm/s; the adhesion of the ice layer was characterized by the shear strength required to push down the icicle.

The test result shows that the adhesion of the ice layer was 50 kPa.

Comparative Example 1

The heat treatment was performed as follows: polypropylene resin was washed with absolute ethanol for 5 minutes, then washed with distilled water 3 times, and blown to dry with a blower, and dried in a constant temperature oven at 60° C., obtaining a pretreated polypropylene resin for use; the pretreated polypropylene resin was placed in the middle of polyurethane release cloths, then wrapped with tin tape, and hot pressed in a flat vulcanizer at 1 MPa and 180° C. for 40 minutes, obtaining a self-reinforced PP material.

According to the test method of Use Example 1, the anti-icing performance of the obtained self-reinforced PP material was tested, and the test result shows that the adhesion of the ice layer was 66 kPa.

Comparing the test data of Use Example 1 with that of Comparative Example 1, it can be seen that at −20° C., the intelligent anti-icing material according to the present disclosure exhibits that the adhesion of the ice layer to its surface was reduced by 18.2-24.2%, compared with that of the self-reinforced PP material, showing that the material according to the present disclosure has good ice detachment ability.

It can be seen from the above examples that the intelligent anti-icing material of the present disclosure has a good anti-icing effect without energy consumption from additional heat source, and is convenient for use, could effectively prevent the occurrence of ice layer on the surface of the material or device, reduce or even eliminate energy consumption for deicing, and meet the safety requirements for anti-icing. The preparation method according to the disclosure is safe, simple, easy to operate, suitable for industrial promotion, and has great economic value.

The above are only the preferred embodiments of the present disclosure. It should be pointed out that for those of ordinary skill in the art, without departing from the principle of the present disclosure, several improvements and modifications could be made, and these improvements and modifications shall also fall within the protection scope of the present disclosure.

What is claimed is:

1. An intelligent anti-icing material, comprising
a hydrophobic resin,
a nickel-titanium alloy wire embedded in the hydrophobic resin, and
a binder for bonding the nickel-titanium alloy wire to the hydrophobic resin,
wherein:
the hydrophobic resin has a thermal expansion coefficient of not less than $90.5 \times 10^{-6}$ $K^{-1}$;
the nickel-titanium alloy wire has a martensite transformation point temperature in a range of −30 to −10° C.;
the nickel-titanium alloy wire has a length of 0.3 to 1.5 cm and a diameter of 70 to 160 μm; and
the binder is a Schiff alkali metal complex.

2. The intelligent anti-icing material as claimed in claim 1, wherein the hydrophobic resin is polypropylene resin or polyether ether ketone resin.

3. The intelligent anti-icing material as claimed in claim 1, wherein the nickel-titanium alloy wire comprises not less than 50.5% by weight of nickel.

4. The intelligent anti-icing material as claimed in claim 3, wherein the nickel-titanium alloy wire accounts for 10 to 30% of a total volume of the hydrophobic resin and the nickel-titanium alloy wire.

5. The intelligent anti-icing material as claimed in claim 1, wherein the nickel-titanium alloy wire accounts for 10 to 30% of a total volume of the hydrophobic resin and the nickel-titanium alloy wire.

6. The intelligent anti-icing material as claimed in claim 1, wherein the Schiff alkali metal complex is di-tert-butyl salicylaldehyde-ethylenediamine-titanium complex.

7. The intelligent anti-icing material as claimed in claim 1, wherein the intelligent anti-icing material is prepared by a method comprising
(1) hydroxylating the nickel-titanium alloy wire, to obtain a hydroxylated nickel-titanium alloy wire;
(2) coating the hydroxylated nickel-titanium alloy wire obtained in step (1) with the binder, to obtain a nickel-titanium alloy wire coated with the binder; and
(3) subjecting the nickel-titanium alloy wire coated with the binder obtained in step (2) and the hydrophobic resin to a mixing-granulating process first, and then an injection molding process, to obtain the intelligent anti-icing material.

8. The intelligent anti-icing material as claimed in claim 7, wherein the binder is di-tert-butyl salicylaldehyde-ethylenediamine-titanium complex.

9. A method for preventing an ice layer from coating a device or material, comprising,
providing a coating of the intelligent anti-icing material as claimed in claim 1 on a surface of the device or material by coating and hot pressing; and
creating cracks at an interface between the ice layer and a surface of the coating through phase transformation under a condition that the surrounding temperature decreases.

10. A method for preparing the intelligent anti-icing material as claimed in claim 1, comprising,
(1) hydroxylating the nickel-titanium alloy wire, to obtain a hydroxylated nickel-titanium alloy wire;
(2) coating the hydroxylated nickel-titanium alloy wire obtained in step (1) with the binder, to obtain a nickel-titanium alloy wire coated with the binder; and
(3) subjecting the nickel-titanium alloy wire coated with the binder obtained in step (2) and the hydrophobic resin to a mixing-granulating process first, and then an injection molding process, to obtain the intelligent anti-icing material.

11. The method as claimed in claim 10, wherein hydroxylating the nickel-titanium alloy wire is performed by using a Piranha solution, and hydroxylating the nickel-titanium alloy wire is performed at a temperature of 70 to 90° C. for 3 to 5 minutes.

12. The method as claimed in claim 11, further comprising, before hydroxylating the nickel-titanium alloy wire in step (1), subjecting the nickel-titanium alloy wire to a heat treatment first and then a washing-drying treatment.

13. The method as claimed in claim 10, further comprising, before hydroxylating the nickel-titanium alloy wire in step (1), subjecting the nickel-titanium alloy wire to a heat treatment first and then a washing-drying treatment.

14. The method as claimed in claim 13, wherein subjecting the nickel-titanium alloy wire to the heat treatment comprises subjecting the nickel-titanium alloy wire to an annealing treatment first and then a high-temperature treatment; the annealing treatment is performed at a temperature of 400 to 700° C. for 20 to 130 minutes; and the high-temperature treatment is performed at a temperature of 300 to 450° C. for 12 to 24 hours.

15. The method as claimed in claim 10, wherein the Schiff alkali metal complex is di-tert-butyl salicylaldehyde-ethylenediamine-titanium complex.

* * * * *